(No Model.)
J. H. SCHMITZ.
HORSE COLLAR FASTENER.
No. 458,288. Patented Aug. 25, 1891.
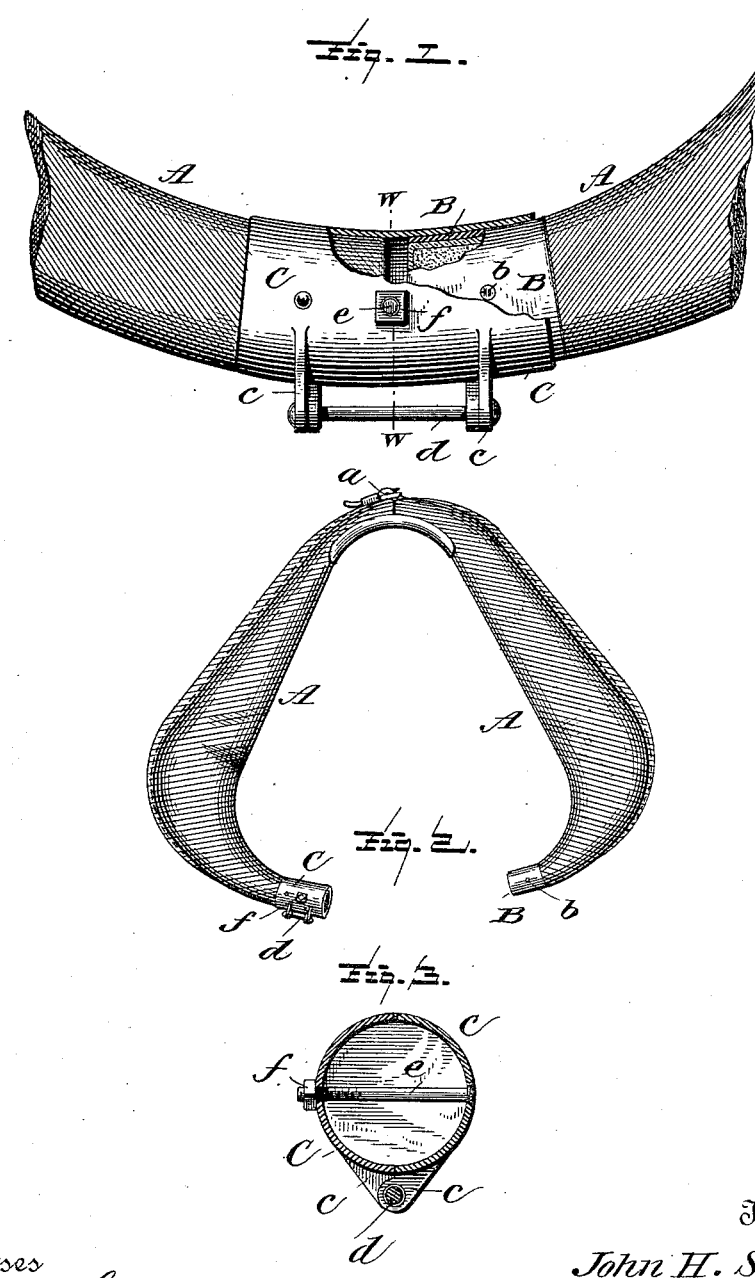
Witnesses
F. C. Hills.
E. H. Bond
Inventor
John H. Schmitz
E. B. Stocking
Attorney

UNITED STATES PATENT OFFICE.

JOHN H. SCHMITZ, OF CLINTON, IOWA.

HORSE-COLLAR FASTENER.

SPECIFICATION forming part of Letters Patent No. 458,288, dated August 25, 1891.

Application filed September 4, 1890. Renewed July 28, 1891. Serial No. 400,947. (No model.)

*To all whom it may concern:*

Be it known that I, JOHN H. SCHMITZ, a citizen of the United States, residing at Clinton, in the county of Clinton, State of Iowa, have invented certain new and useful Improvements in Horse-Collar Fasteners, of which the following is a specification, reference being had therein to the accompanying drawings.

This invention relates to certain new and useful improvements in horse-collar fastenings; and it has for its object, among others, to provide a simple, cheap, and durable fastening which requires no locking, the parts being held together by the hames. It is readily applied to collars already on the market. The two parts can be quickly united, even in the dark, and they protect the ends of the two parts of the collar.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is an enlarged view of the adjacent ends of the two portions of a collar with my improved fastener applied, with parts broken away to better show the construction. Fig. 2 is a side view of the collar complete, with the fastener in position and the two parts disconnected. Fig. 3 is a section through the line *w w* of Fig. 1.

Like letters of reference indicate like parts in both views.

Referring now to the details of the drawings by letter, A designates the two parts of a horse-collar, which two parts are connected together at the top—as, for instance, by a buckle *a*—and to the other ends my fasteners are applied. To the end of one part of the collar I attach a ferrule B, which is secured thereto in any suitable manner, as by a rivet *b*, the said ferrule embracing and protecting the end of the collar. On the end of the other part of the collar I affix in any suitable manner—as, for instance, by a rivet or rivets—a ferrule C, which is larger than the ferrule B and which, while it embraces the end of the collar and protects the same, extends beyond the end of the collar, as seen in Fig. 1, to receive the ferrule B when the parts are brought together.

To place the collar upon the horse it is opened, as shown in Fig. 2, and then placed upon the horse and the two parts brought together and the ferrule B slipped into the ferrule C, as seen in Fig. 1. With the parts thus united they are thus held by the hames of the harness around the collar.

The ferrule C is made in two parts, as seen in Fig. 3, hinged together by means of the lugs *c* and pin or bolt *d*. The object of this is so that when the bolt is passed through and the ferrule is placed on the end of the collar it can be drawn securely onto the collar and then riveted in place, and the pin or bolt of the hinge being placed at the lower side of the collar can be used to receive the strap which holds up the martingale.

The bolt *e* is provided with a nut *f*, so that the two parts of the ferrule can be tightened when necessary.

What I claim as new is—

The combination, with a two-part collar, of a ferrule secured to one end of one part and a ferrule formed in two parts, each provided with ears and embracing the adjacent end of the other part of the collar, a pin joining the ears, a transverse bolt, and a nut on the said bolt, the last-mentioned ferrule being adapted to receive the first-mentioned ferrule, substantially as and for the purpose specified.

In testimony whereof I affix my signature in presence of two witnesses.

JOHN H. SCHMITZ.

Witnesses:
C. W. CHASE,
JOHN JACKSON.